Oct. 21, 1969    H. MAINKA    3,473,186
WINDSHIELD WIPER FOR AUTOMOBILES OR THE LIKE
Filed Feb. 29, 1968
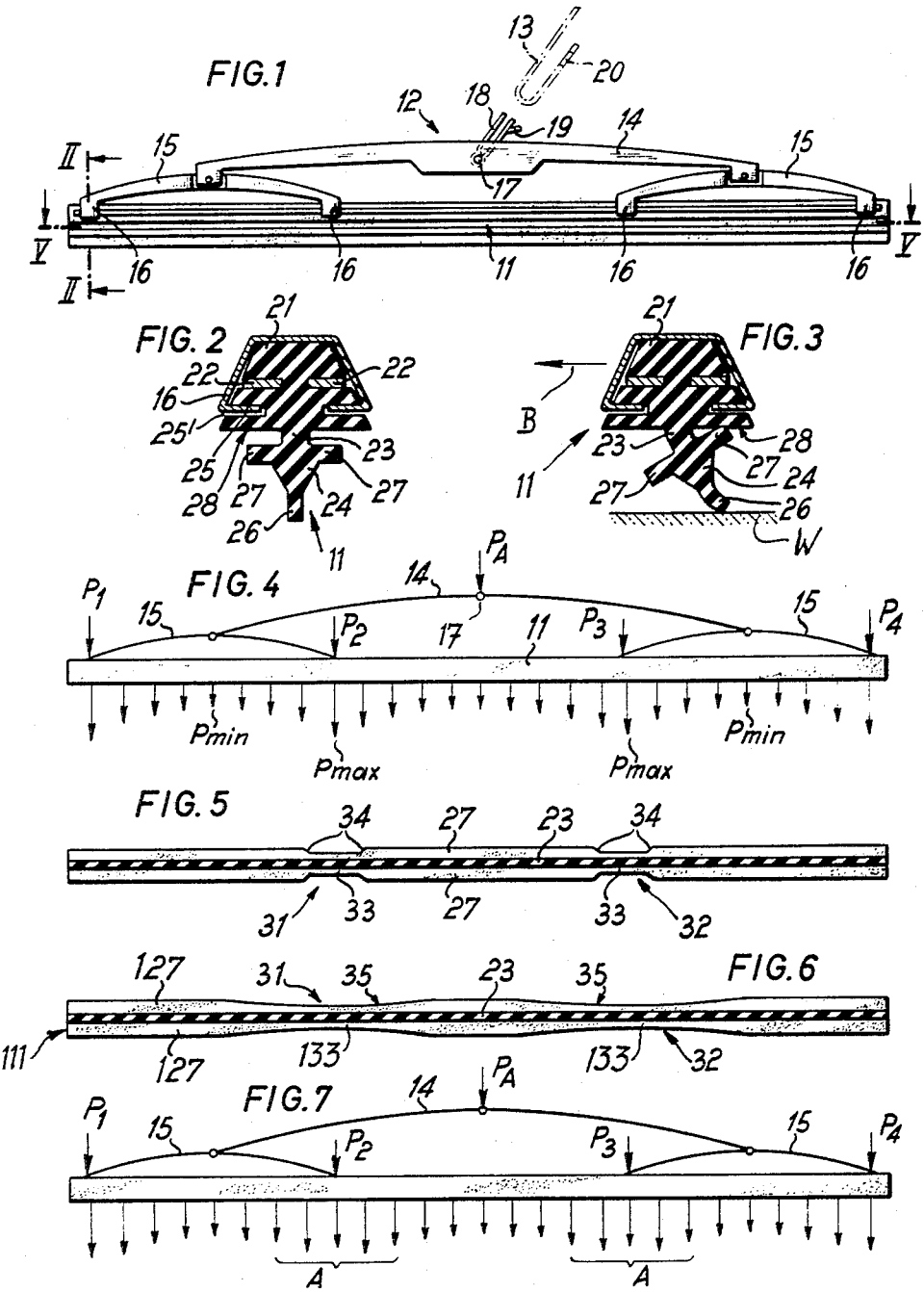
INVENTOR:
Hubert MAINKA
BY Michael S. Striker
his ATTORNEY

United States Patent Office 3,473,186
Patented Oct. 21, 1969

3,473,186
WINDSHIELD WIPER FOR AUTOMOBILES
OR THE LIKE
Hubert Mainka, Buhlertal, Germany, assignor to Robert Bosch, G.m.b.H., Stuttgart, Germany
Filed Feb. 29, 1968, Ser. No. 709,489
Claims priority, application Germany, Mar. 1, 1967, B 91,419
Int. Cl. B60s 1/38
U.S. Cl. 15—250.36                                        10 Claims

ABSTRACT OF THE DISCLOSURE

The lip of the blade in a windshield wiper is flanked by two flanges one of which abuts against the reinforced head portion of the blade when the lip bears against the surface of a windshield. The blade is moved back and forth by a system of articulately connected levers the end portions of which carry claws which are coupled to the head portion. The width of the flanges is reduced at two or more points in the zones where the claws engage the head portion of the blade so that the corresponding portions of the lip can undergo more pronounced flexing and the lip applies a more uniform pressure to the surface of the windshield. The width of the flanges can change gradually or stepwise.

---

The present invention relates to windshield wipers in general, and more particularly to improvements in windshield wipers of the type wherein a blade of rubber or like elastomeric material has a lip which is pressed against and moves along the surface of a windshield when the wiper is in use and wherein the lip is flanked by two lateral flanges one of which bears against a reinforced head portion of the blade in response to engagement between the lip and the windshield. Such blades are normally moved and pressed against the windshield by a system of articulately connected levers the end portions of which carry claws which are coupled to the head portion of the blade so as to straddle one or more reinforcing inserts in the head portion. In such windshield wipers, the levers transmit to the head portion pressure by way of claws whereby the reinforcing inserts enhance the resistance which the head portion offers to deformation to insure that the lip is pressed against the windshield along its entire length. The lip is normally connected with the head portion by a narrow neck portion which is flexed when the lip travels along the windshield whereby one of the flanges bears against the head portion to prevent further deformation of the neck portion and to cause the lip to sweep along the exposed surface of the windshield.

A drawback of conventional windshield wipers wherein the profile of the blade and of its insert or inserts is constant from end to end is that the specific pressure which the lip transmits to the surface of the windshield varies considerably along the length of the blade. The specific pressure is greatest in zones which are adjacent to the claws and decreases gradually or suddenly to a minimum value in zones which are located between successive pairs of claws. Such non-uniform distribution of specific pressures is due to the fact that the blade and its reinforcing insert or inserts buckle or bend in regions between successive pairs of claws. It can happen that the minimum pressure does not suffice to insure satisfactory cleaning of the windshield, especially if the blade is long and if the claws engage only a few spaced portions of the blade.

It was already proposed to reduce or to eliminate such bending or buckling of the blade by reinforcing its head portion with profiled metallic rails which are provided with one or more stiffening ribs. However, the manufacturing cost of such profiled rails necessitates the use of complicated and expensive machinery and tools which undergo considerable wear. Furthermore, the lip of a strongly reinforced blade is incapable of sweeping along the surface of a curved windshield. Therefore, such proposals failed to gain widespread acceptance in the industry.

It is also known to reinforce the blade with a rail which consists of synthetic plastic material and is bonded to the rear face of the head portion and whose cross-sectional area increases in directions away from the claws to prevent excessive buckling of the blade. The drawbacks of this proposal are the same as those which were outlined above, i.e., the cost of the windshield wiper is increased considerably and the lip is incapable of properly cleaning the surface of a curved windshield.

Summary of the invention

It is an object of the present invention to provide a windshield wiper wherein the lip of the elastic blade bears against the windshield with a specific pressure which varies very little in the longitudinal direction of the blade and wherein such desirable distribution of pressures is achieved in a simple and inexpensive way.

Another object of the invention is to provide a windshield wiper of the just outlined character wherein a highly satisfactory distribution of pressures between the lip and the windshield is achieved without resorting to complicated reinforcing inserts for the blade.

A further object of the invention is to provide a windshield wiper wherein the improved distribution of pressures between the lip and the windshield is attributable solely to a novel design of flanges.

A concomitant object of the invention is to provide a windshield wiper wherein the length of zones in which the pressure between the lip and windshield is substantially constant exceeds considerably the length of such zones in a conventional windshield wiper.

The blade of the improved windshield wiper comprises flanges whose width varies along the length of the blade in a plane which is parallel to the exposed surface of the windshield and in such a way that the width is minimal in zones which are adjacent to areas where the claws of the motion- and pressure-transmitting levers engage the head portion of the blade. This enables the lip to undergo more pronounced flexing in regions which are adjacent to the claws and to thereby insure more uniform distribution of pressures between the lip and the windshield.

The novel features which are considered as characteristic of the invention are set forth in particular in the appended claims. The improved windshield wiper itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a side elevational view of a windshield wiper which embodies one form of my invention;

FIG. 2 is an enlarged transverse vertical sectional view as seen in the direction of arrows from the line II—II of FIG. 1;

FIG. 3 is a similar sectional view and illustrates the lip of the windshield wiper blade during engagement with a windshield;

FIG. 4 is a schematic side elevational view of a conventional windshield wiper and illustrates the distribution of pressures between the lip of the blade and the surface of the windshield;

FIG. 5 is a horizontal sectional view as seen in the direction of arrows from the line V—V of FIG. 1;

FIG. 6 is a similar horizontal sectional view of a modified windshield wiper blade; and FIG. 7 illustrates the distribution of pressures between the surface of a windshield and the lip of the windshield wiper blade shown in FIG. 5 or 6.

Description of the preferred embodiments

The windshield wiper of FIGS. 1 to 3 comprises a wiper blade 11 of rubber or like elastomeric material, a carrier unit 12 which resembles a whippletree and comprises a centrally located two-armed main lever 14 and two intermediate levers 15 pivoted to the ends of the main lever 14, and a windshield wiper arm 13 which is indicated in FIG. 1 by phantom lines. The end portions of intermediate levers 15 are provided with holders in the form of pairwise arranged claws 16 which straddle the adjoining portions of the blade 11 and hold such portions with requisite clearance to permit proper operation of the wiper. The main lever 14 carries a centrally located fulcrum pin 17 for a two-armed springy coupling member 18 which can be detachably connected to the arm 13. To this end, the latter comprises a hook-shaped end portion which can be applied around the pin 17 and is provided with a notch or slot 20 for a projection 19 of the coupling member 18. The projection 19 constitutes a quick-release connector between the member 18 and arm 13 and prevents uncontrolled separation of the carrier unit 12.

The blade 11 comprises an elongated head portion or beam 21 whose side faces are formed with longitudinally extending slits for two flexible metallic stiffening or reinforcing rails 22 of spring steel or the like. A longitudinally extending relatively narrow neck portion 23 connects the head portion 21 with a front portion 24 which comprises a longitudinally extending wiping portion or lip 26 and two normally coplanar lateral flanges 27 whose plane is parallel to the exposed surface of the windshield in undeformed condition of the blade. The bottom part or base 28 of the head portion 21 has two longitudinally extending lateral grooves 25' for the bent-over tips 25 of claws 16. The flanges 27 cooperate with the base 28 to limit the flexing of lip 26 on contact with a windshield. When the windshield wiper is in use and the levers 15 cause the blade 11 to move sideways in the direction indicated in FIG. 3 by arrow B, the lip 26 is pressed against the windshield W and the neck portion 23 undergoes deformation so that the trailing flange 27 can move into abutment with the base 28 in order to prevent further flexing of the front portion 24. Such flexing of the front portion 24 takes place in response to pressure which is transmitted to blade 11 by claws 16 and also because the lip 26 is in frictional engagement with the exposed surface of the windshield W. When the trailing flange 27 abuts against the base 28 in a manner as shown in FIG. 2, it transmits pressure from the arm 13 to the lip 26 and causes the latter to sweep the windshield in response to displacement of the blade 11.

FIG. 4 illustrates the distribution of pressures in a conventional windshield wiper which comprises flanges of constant width from end to end, i.e., wherein the profile of the blade 11 is constant all the way from the outer end of one lever 15 to the outer end of the other lever 15, and wherein the profile of reinforcing rails is also constant from end to end. The wiper arm 13 transmits to the fulcrum pin 17 and to the main lever 14 a force $P_A$ which is divided into two smaller forces acting on the pivots which connect the ends of main lever 14 with the centers of levers 15. The end portions of levers 15 transmit to the blade 11 forces P1, P2, P3, P4 by way of the claws 16. The forces P1–P4 are transmitted by rails 22 and head portion 21, which latter possesses some resistance to deformation, to the lip 26 and thence to the exposed surface of the windshield. The lip 26 receives pressure along its full length by way of the trailing flange 27, i.e., by way of the right-hand flange 27 as viewed in FIG. 3. The lip 26 exerts against the windshield W a specific pressure $p$ whose magnitude varies in dependency on the distance from the adjoining claws 16. As shown in FIG. 4, the specific pressure $p$ varies between a maximum specific pressure $p_{max}$ in the zones located adjacent to the claws 16 and a minimum pressure $p_{min}$ in the regions substantially midway between two adjoining pairs of claws. If one disregards the peaks of specific pressure $p$ at the outer ends of the intermediate levers 15, there are two regions or zones 31, 32 where the specific pressure attains a maximum value $p_{max}$, namely, the zones which are adjacent to the inner ends of levers 15. The zones where minimum specific pressure prevails are located below the fulcrum pin 17 and below the centers of intermediate levers 15. Such unequal distribution of specific pressures is undesirable because the lip 26 can produce streaks which interfere with the driver's vision in bad weather.

In accordance with a first embodiment of the present invention which is illustrated in FIG. 5, the flanges 27 are provided with narrower portions or throats 33 which are adjacent to the inner ends of levers 15 and which, therefore, permit more pronounced flexing of adjoining portions of the lip 26. In other words, the resistance of the front portion 24 to deformation in response to engagement with the windshield W is reduced in the zones 31 and 32 so that the peaks $p_{max}$ of specific pressure applied to the surface of the windshield are reduced and the distribution of specific pressure $p$ is more gradual. The throats 33 are separated from the remaining portions of flanges 27 by surfaces 34 which extend substantially at right angles to the longitudinal direction of the blades 11. The width of each throat 33 is substantially constant, i.e., the transition between the wider and narrower portions of the flanges is sudden and takes place in stepwise fashion. It will be noted that each throat in one of the flanges 27 is located opposite a throat in the other flange.

FIG. 6 illustrates a modified wiper blade 111 whose flanges 127 are provided with relatively long throats 133 which take up a substantial part of the overall length of the respective flanges. The arrangement is such that the width of the throats varies gradually from the narrowest parts in the zones 31, 32 to the widest parts located substantially below the centers of the outer levers 15. The throats 133 may be bounded by substantially straight or by concave surfaces 35. Here again, the lip of the blade 111 can undergo maximum flexing in the zones 31, 32 to thus compensate for unavoidable buckling of reinforcing rails in the spaces between the pairs of claws 16. Consequently, the distribution of specific pressures is much more uniform than in the conventional wiper of FIG. 4.

FIG. 7 illustrates schematically the distribution of specific pressures which are transmitted by a wiper blade of the type shown in FIG. 5 or 6. It will be seen that those portions of the lip which are adjacent to the zones 31 and 32 take up lesser stresses than in the wiper of FIG. 4. The peaks $p_{max}$ of FIG. 4 are reduced and the regions A in which the lip exerts a maximum specific pressure are longer. At the same time, the specific pressures in regions between the peaks are more pronounced so that the overall distribution of specific pressures is much more satisfactory than in conventional wipers.

In the embodiments of FIGS. 5 and 6, the width of flanges 27, 127 is not reduced adjacent to the two outermost pairs of claws 16, i.e., at the ends of the blade 11 or 111. This is due to the fact that it is normally more important to prevent streaking in the central parts of the area which is being swept by the lip 26. Furthermore, it is often undesirable to reduce the strength of the blade at the upper end of the blade in order to avoid premature tearing along the neck portion 23 and to insure that the lip can properly follow the outline of a curved windshield. However, it is equally within the purview of the present invention to reduce the width of flanges 27 or 127 at one or both ends of the respective blades, i.e., at each point where the head portion of the blade is engaged by claws. The number of throats in the flanges depends on the circumstances, but it is normally desirable to provide such throats in each zone where the head portion of the blade is engaged by those claws which are remote from the ends of the blade.

What is claimed as new and desired to be protected by Letters Patent is set forth in the appended claims:

1. In a windshield wiper of the type wherein an elongated blade of elastomeric material comprises a reinforced head portion having a base face, a windshield wiping portion having a pair of flanges located in the undeformed condition of the blade downwardly spaced from and substantially parallel to said base face, and a central neck portion connecting said head portion with said wiping portion so that during travel of said blade along said windshield, said neck and said wiping blade along said windshield, said neck and said wiping portions will flex to include an angle with said head portion and one of said flanges will abut with its outer edge against said base face to thereby limit the angle of flexing, and wherein the blade is moved by a carrier unit which applies pressure to several longitudinally spaced zones of the head portion whereby the latter transmits such pressure to the wiping portion, the improvement which consists in that each of said flanges comprises in at least one of the regions of one of said zones at least one portion the width of which is reduced in a plane parallel to said base face so as to permit more pronounced flexing of the adjoining parts of said wiping portion.

2. The improvement as defined in claim 1, wherein each of said flanges comprises two portions of minimum width and a portion of maximum width between said portions of minimum width.

3. The improvement as defined in claim 2, wherein the width of each of said flanges varies gradually between said portions of minimum width and said portion of maximum width.

4. The improvement as defined in claim 2, wherein the width of each of said flanges changes stepwise between said portion of maximum width and said portions of minimum width.

5. The improvement as defined in claim 1, wherein said head portion is above said base face by at least one metallic insert of constant cross section.

6. The improvement as defined in claim 1, wherein said said carrier unit comprises a plurality of articulately connected levers having end portions provided with claws connected above said base face to said longitudinally spaced zones of the head portion.

7. The improvement as defined in claim 1, wherein said flanges are disposed in a common plane which is substantially parallel to the exposed surface of the windshield in undeformed condition of the blade.

8. The improvement as defined in claim 1, wherein each of said flanges comprises several portions of reduced width.

9. The improvement as defined in claim 1, wherein each portion of reduced width of one of said flanges is located opposite a portion of reduced width of the other flange.

10. The improvement as defined in claim 1, wherein said flanges have a uniform thickness throughout the length of said blade.

References Cited

UNITED STATES PATENTS

| | | | |
|---|---|---|---|
| 3,089,175 | 5/1963 | Hinder | 15—250.36 |
| 3,140,501 | 7/1964 | MacPherson | 15—250.36 |
| 3,141,186 | 7/1964 | Scinta | 15—250.42 |
| 3,224,027 | 12/1965 | Oishei et al. | 15—250.41 |
| 3,414,930 | 12/1968 | Kodama | 15—250.36 |

FOREIGN PATENTS 67,859    10/1957    France.

PETER FELDMAN, Primary Examiner

U.S. Cl. X.R.

15—250.42